United States Patent
Bonin et al.

(10) Patent No.: US 10,783,489 B2
(45) Date of Patent: Sep. 22, 2020

(54) DANGEROUS GOODS SHIPPING MANAGEMENT SYSTEMS

(71) Applicant: United Parcel Service of America, Inc., Atlanta, GA (US)

(72) Inventors: Paul Bonin, Dunwoody, GA (US); Kaj Engberg, Atlanta, GA (US); Shawn Collins, Atlanta, GA (US); Taylor Janney, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 240 days.

(21) Appl. No.: 15/895,767

(22) Filed: Feb. 13, 2018

(65) Prior Publication Data

US 2018/0232690 A1    Aug. 16, 2018

Related U.S. Application Data

(60) Provisional application No. 62/458,729, filed on Feb. 14, 2017.

(51) Int. Cl.
*G05B 19/04* (2006.01)
*G06Q 10/08* (2012.01)
(Continued)

(52) U.S. Cl.
CPC ....... *G06Q 10/087* (2013.01); *G05B 19/0421* (2013.01); *G05B 19/0428* (2013.01);
(Continued)

(58) Field of Classification Search
CPC ............. G06Q 10/087; G06Q 10/0832; G05B 19/0428; G05B 19/128; G05B 19/0421; G05B 19/4189

See application file for complete search history.

(56) References Cited

U.S. PATENT DOCUMENTS

| | | | | |
|---|---|---|---|---|
| 5,959,568 A | * | 9/1999 | Woolley | G01S 5/0289 235/385 |
| 6,539,360 B1 | * | 3/2003 | Kadaba | G06Q 10/08 700/215 |

(Continued)

OTHER PUBLICATIONS

International Preliminary Report on Patentability received for PCT Patent Application No. PCT/US2018/018186, dated Aug. 29, 2019, 8 pages.

(Continued)

*Primary Examiner* — Patrick H Mackey
(74) *Attorney, Agent, or Firm* — Shook, Hardy & Bacon, LLP

(57) ABSTRACT

As deliveries of items containing dangerous goods are made from a vehicle/container, systems update stored information to reflect the reduced number of points of dangerous goods currently on the vehicle/container. Conversely, when the vehicle/container picks up dangerous goods, the systems update the information to reflect the increased number of points of dangerous goods currently on the vehicle/container. The systems identify potential delivery routes, such that the vehicle/container may deliver items containing dangerous goods prior to picking up new items, so as to maintain the total points of dangerous goods on the vehicle/container below a predetermined threshold.

20 Claims, 7 Drawing Sheets

Figure 1:
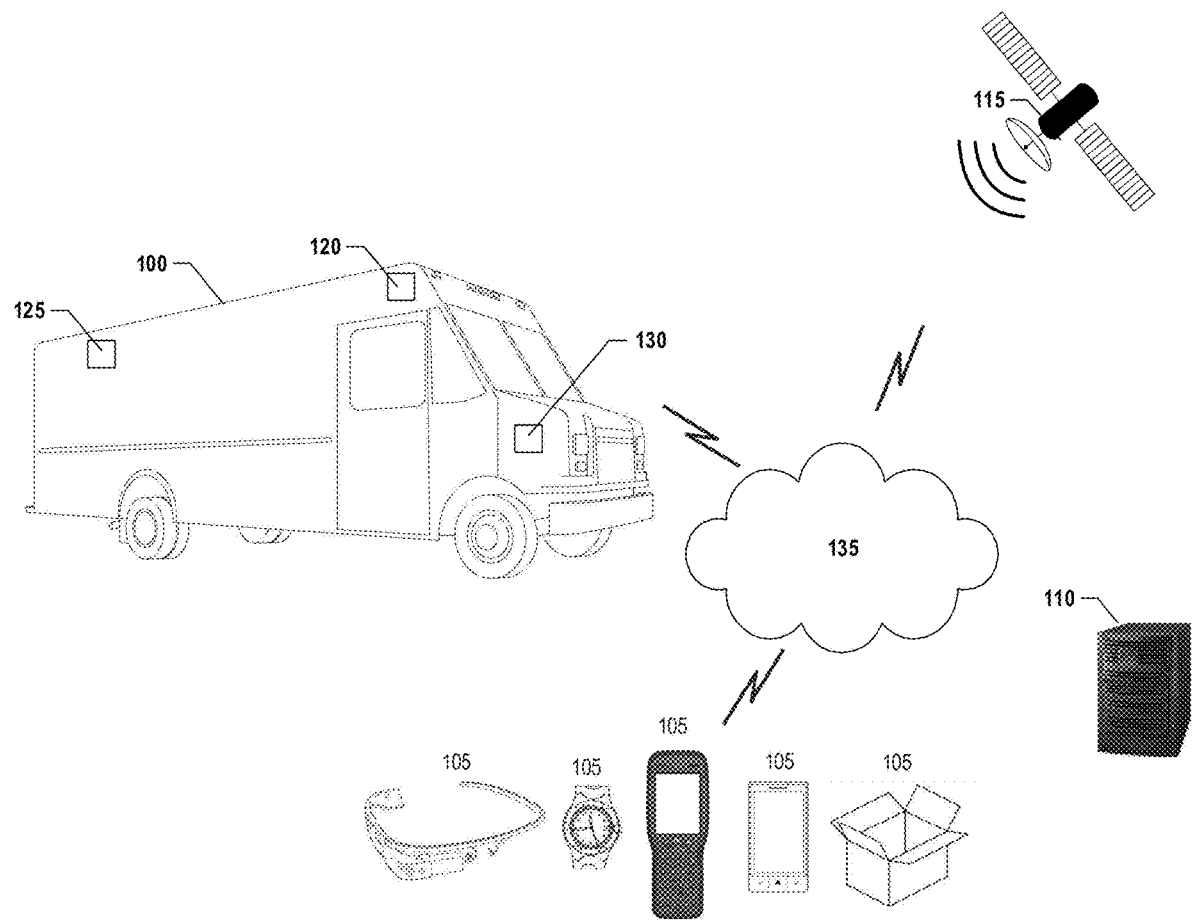

(51) Int. Cl.
G05B 19/418 (2006.01)
G05B 19/042 (2006.01)
G05B 19/12 (2006.01)

(52) U.S. Cl.
CPC ....... G05B 19/128 (2013.01); G05B 19/4189 (2013.01); G06Q 10/0832 (2013.01); G05B 19/042 (2013.01); G06Q 10/08355 (2013.01)

(56) References Cited

U.S. PATENT DOCUMENTS

| | | |
|---|---|---|
| 6,748,320 B2 * | 6/2004 | Jones ................... G06Q 10/08 340/989 |
| 2013/0006739 A1 * | 1/2013 | Horvitz ................. G06Q 30/06 705/14.23 |
| 2013/0262251 A1 * | 10/2013 | Wan ................... G06Q 10/0836 705/26.1 |
| 2015/0046298 A1 * | 2/2015 | Zwakhals ............ G06Q 10/087 705/28 |
| 2015/0269520 A1 | 9/2015 | Knapp et al. |
| 2016/0042320 A1 | 2/2016 | Dearing et al. |
| 2016/0180274 A1 * | 6/2016 | Zwakhals ........ G06Q 10/06315 705/7.25 |
| 2016/0258773 A1 * | 9/2016 | Santilli ............. G01C 21/3614 |
| 2017/0011340 A1 | 1/2017 | Gabbai |
| 2018/0174093 A1 * | 6/2018 | Perez ................. G06Q 10/0834 |

OTHER PUBLICATIONS

Extended European Search Report received for European Patent Application No. 18753600.8, dated Jul. 16, 2020, 9 pages.

* cited by examiner

| DG Points Calculator | | | |
|---|---|---|---|
| Item | Category | Quantity | Points |
| A | 1 | 5 | 250 |
| B | 2 | 25 | 75 |
| C | 3 | 150 | 150 |
| F | 3 | 20 | 20 |
| G | 1 | 10 | 500 |
| | | Total | 995 |

Fig. 6A

| DG Points Calculator | | | |
|---|---|---|---|
| Item | Category | Quantity | Points |
| B | 2 | 25 | 75 |
| C | 3 | 150 | 150 |
| F | 3 | 20 | 20 |
| G | 1 | 10 | 500 |
| | | Total | 745 |

Fig. 6B

| DG Points Calculator | | | |
|---|---|---|---|
| Item | Category | Quantity | Points |
| C | 3 | 150 | 150 |
| F | 3 | 20 | 20 |
| G | 1 | 10 | 500 |
| | | Total | 670 |

Fig. 6C

| DG Points Calculator | | | |
|---|---|---|---|
| Item | Category | Quantity | Points |
| D | 1 | 5 | 250 |
| E | 1 | 5 | 250 |
| F | 3 | 20 | 20 |
| G | 1 | 10 | 500 |
| | | Total | 1020 |

Fig. 6D

| DG Points Calculator | | | |
|---|---|---|---|
| Item | Category | Quantity | Points |
| D | 1 | 5 | 250 |
| E | 1 | 5 | 250 |
| F | 3 | 20 | 20 |
| | | Total | 520 |

Fig. 6E

DANGEROUS GOODS SHIPPING MANAGEMENT SYSTEMS

CROSS-REFERENCE TO RELATED APPLICATIONS

This application claims the benefit of provisional U.S. Application No. 62/458,729 entitled "Dangerous Goods Shipping Management Systems," filed on Feb. 14, 2017, which is herein incorporated by reference in its entirety.

BACKGROUND

Various goods, such as flammables and explosives, have been designated by different jurisdictions as "dangerous goods" and may be subject to regulations when shipped. For example, vehicles and containers carrying dangerous goods may require fire suppression systems and there may be requirements regarding access to the dangerous goods during transit.

In some jurisdictions, vehicles and/or transportable containers may have a maximum allowable volume/quantity of dangerous goods that may be carried without affixing a placard to the vehicle and/or transportable container indicating the nature of the dangerous goods being carried. Some jurisdictions may also require vehicles and/or transportable containers including dangerous goods over a maximum allowable volume/quantity of dangerous goods to be transported by a driver with special training. Some jurisdictions may set a maximum allowable volume/quantity of dangerous goods that can be carried in a vehicle and/or transportable container through certain transportation passageways, such as through tunnels, over bridges, or the like.

In such jurisdictions, it is desirable to monitor and manage the volume/quantity of dangerous goods carried by a vehicle/container. For example, in delivery operations, a vehicle/container may travel along a delivery route, where items containing dangerous goods may be both picked up and dropped off at different serviceable points along the delivery route. As items containing dangerous goods are picked up and dropped off, the vehicle/container must maintain a total volume/quantity of dangerous goods that is below the total maximum allowable volume/quantity of dangerous goods. In some instances, the vehicle/container may not be able to pick up some items containing dangerous goods along the scheduled delivery route while maintaining the volume/quantity of dangerous goods on the vehicle/container below the total maximum allowable volume/quantity. In such instances, another vehicle/container may need to be dispatched to pick up the item from the serviceable point, and/or the pick-up of the item may be delayed, which may result in increased costs and customer dissatisfaction.

Accordingly, a need exists for systems and methods for managing dangerous goods carried in a vehicle/container.

BRIEF SUMMARY

In one embodiment, a system for transporting goods includes a cargo area configured for holding a plurality of items, one or more memory storage areas associated with the cargo area, and one or more processors configured for executing the steps of receiving first package materials data associated with a first item positioned within the cargo area, where the first package materials data includes (1) a classification associated with materials positioned within the first item, and (2) a quantity of the materials positioned within the first item, storing the first package materials data in the one or more memory storage areas, determining, based on the first package materials data, a first point value associated with the cargo area based at least in part on the classification and the quantity of the material positioned within the first item, receiving a first delivery route, where the first delivery route includes a first serviceable point at which the first item is scheduled to be removed from the cargo area, receiving a request to pick up a second item at a second serviceable point on the first delivery route, receiving second package materials data associated with the second item, where the second package materials data includes (1) a classification associated with materials positioned within the second item, and (2) a quantity of the materials positioned within the second item, determining, based on the first package materials data and the second package materials data, a second point value, and determining a second delivery route based at least in part on the second point value associated with the first item and the second item.

In another embodiment, a method for transporting goods includes receiving first package materials data associated with a first item positioned within a cargo area, where the first package materials data includes (1) a classification associated with materials positioned within the first item, and (2) a quantity of the materials positioned within the first item, determining, based on the first package materials data, a first point value associated with the cargo area based at least in part on the classification and the quantity of the material positioned within the first item, receiving a first delivery route, where the first delivery route includes a first serviceable point at which the first item is scheduled to be removed from the cargo area, receiving a request to pick up a second item at a second serviceable point on the first delivery route, receiving second package materials data associated with the second item, where the second package materials data includes (1) a classification associated with materials positioned within the second item, and (2) a quantity of the materials positioned within the second item, determining, based on the first package materials data and the second package materials data, a second point value, and determining a second delivery route based at least in part on the second point value associated with the first item and the second item.

In yet another embodiment, a program element is configured and arranged when executed on a computer to implement a method for managing the delivery of goods including receiving first package materials data associated with a first item positioned within a cargo area, where the first package materials data includes (1) a classification associated with materials positioned within the first item, and (2) a quantity of the materials positioned within the first item, determining, based on the first package materials data, a first point value associated with the cargo area based at least in part on the classification and the quantity of the material positioned within the first item, receiving a first delivery route, where the first delivery route includes a first serviceable point at which the first item is scheduled to be removed from the cargo area, receiving a request to pick up a second item at a second serviceable point on the first delivery route, receiving second package materials data associated with the second item, where the second package materials data includes (1) a classification associated with materials positioned within the second item, and (2) a quantity of the materials positioned within the second item, determining, based on the first package materials data and the second package materials data, a second point value, and determining a second delivery route based at least in part on the second point value associated with the first item and the second item.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 schematically depicts a system that can be used to practice various embodiments of the present invention.

Figure 2:
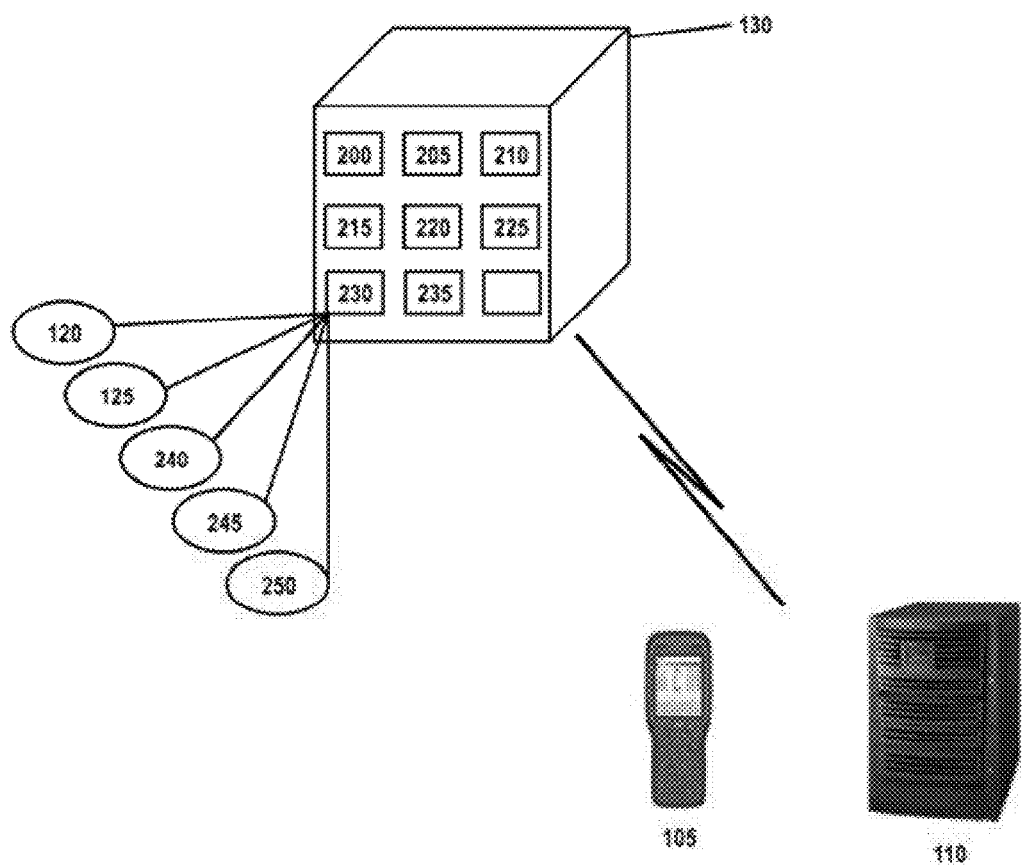

FIG. 2 schematically depicts an information/data collection device that may be used in association with certain embodiments of the present invention.

Figure 3:
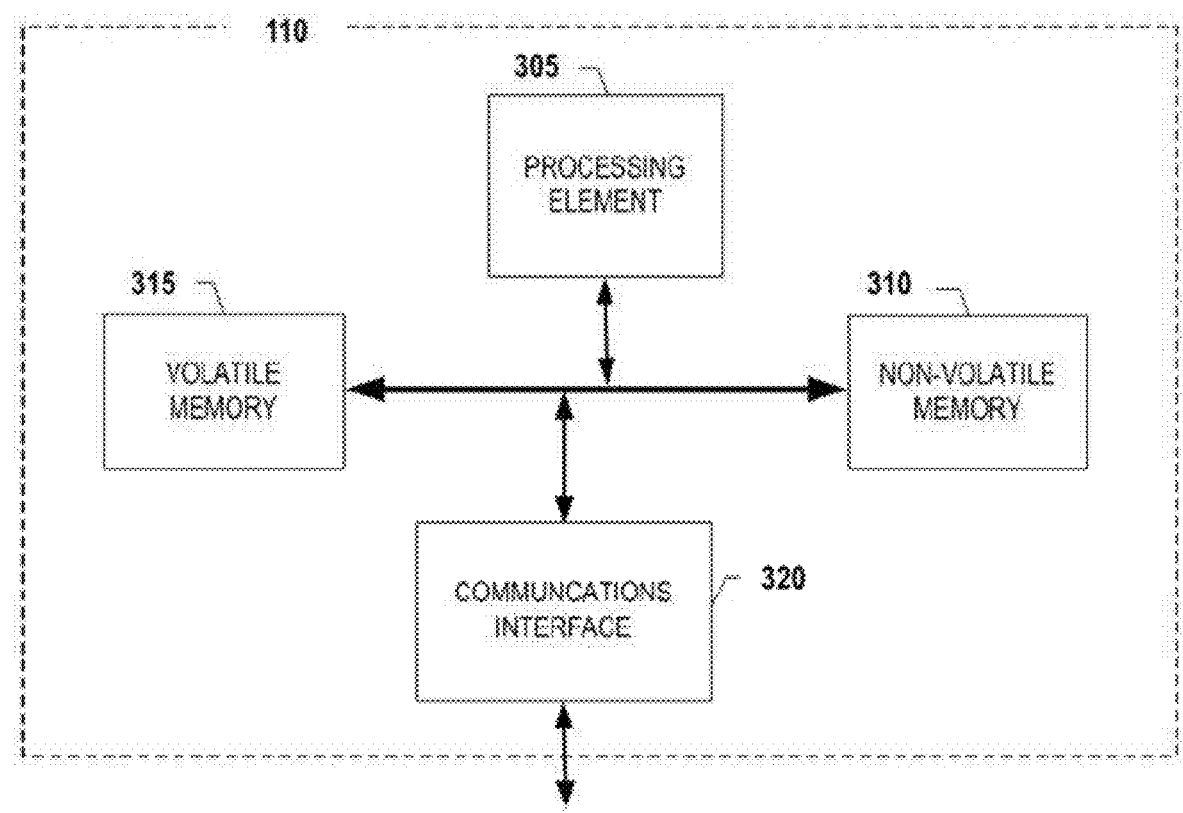

FIG. 3 schematically depicts central computing entity in accordance with certain embodiments of the present invention.

Figure 4:
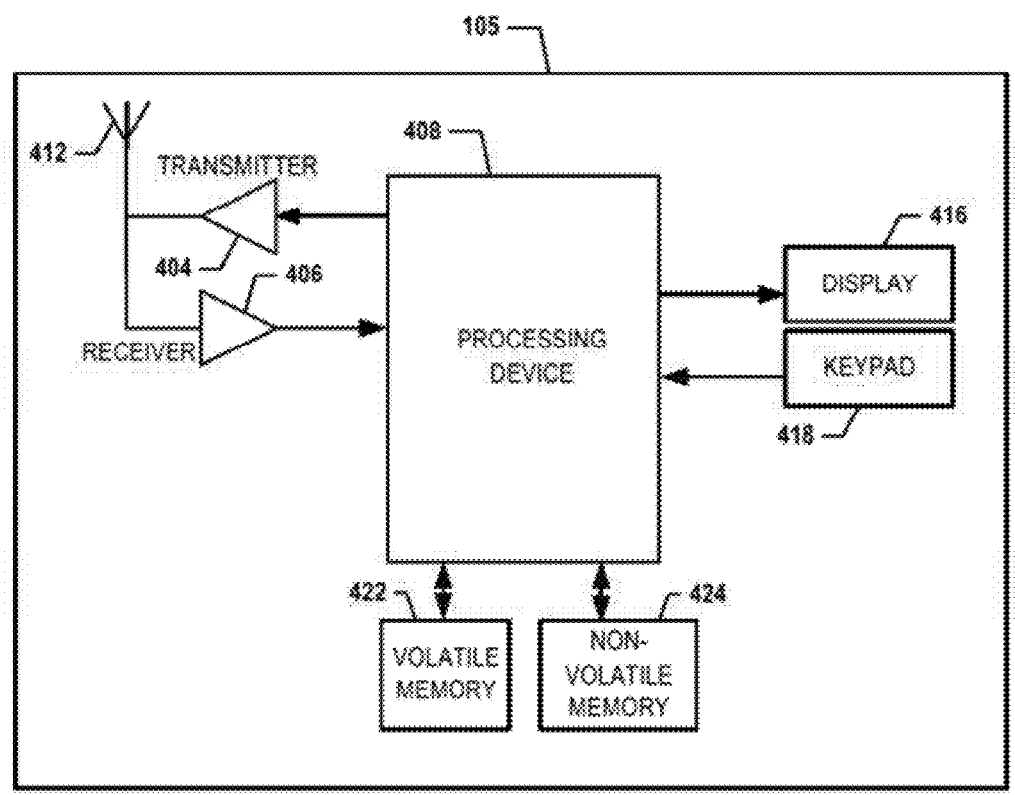

FIG. 4 schematically depicts a mobile computing entity in accordance with certain embodiments of the present invention.

Figure 5:
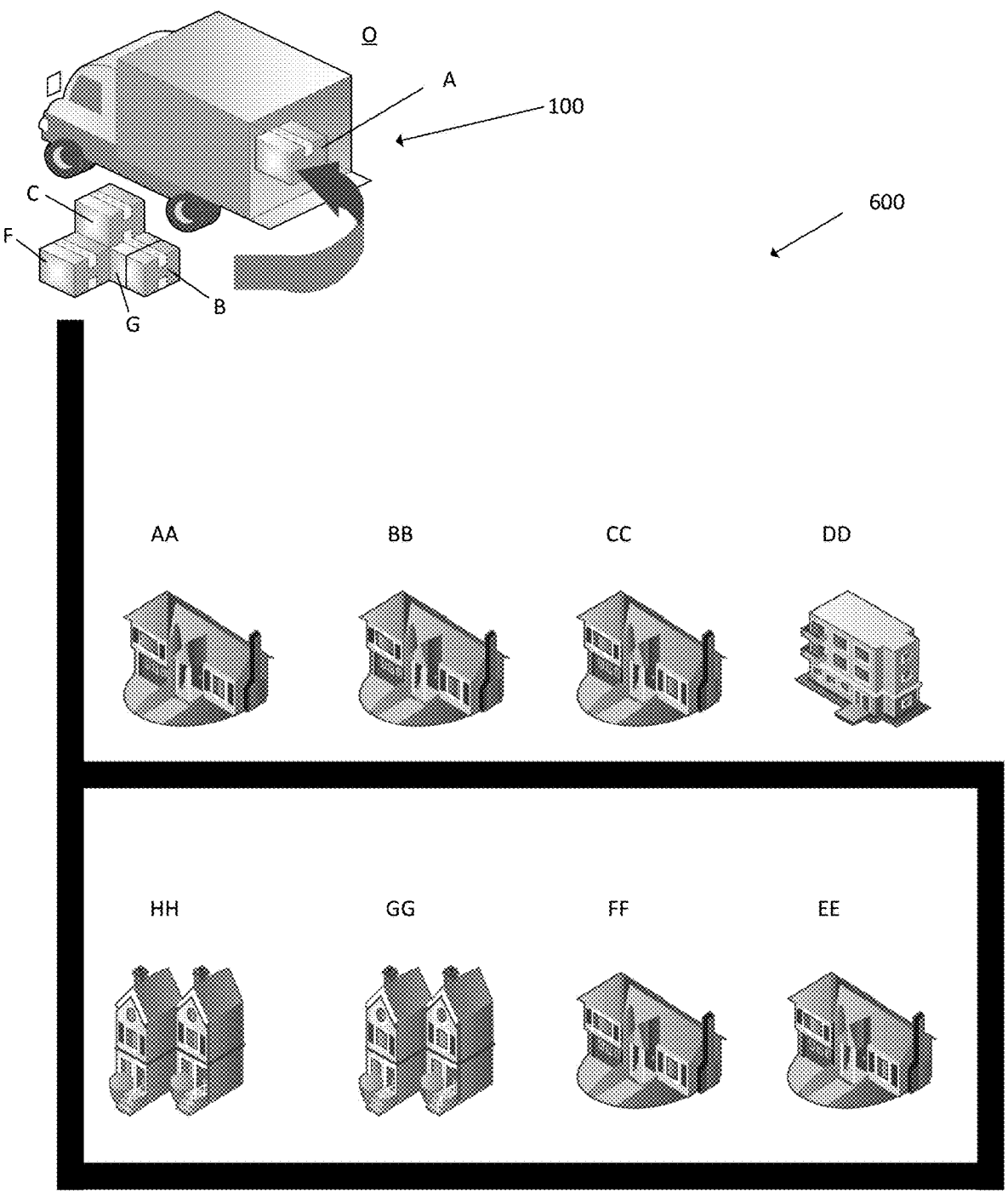

FIG. 5 schematically depicts a vehicle/container and an exemplary delivery route in accordance with certain embodiments of the present invention.

FIGS. 6A-6E schematically depict exemplary calculations of points of dangerous goods within the vehicle/container of FIG. 5 in accordance with certain embodiments of the present invention.

Figure 7:
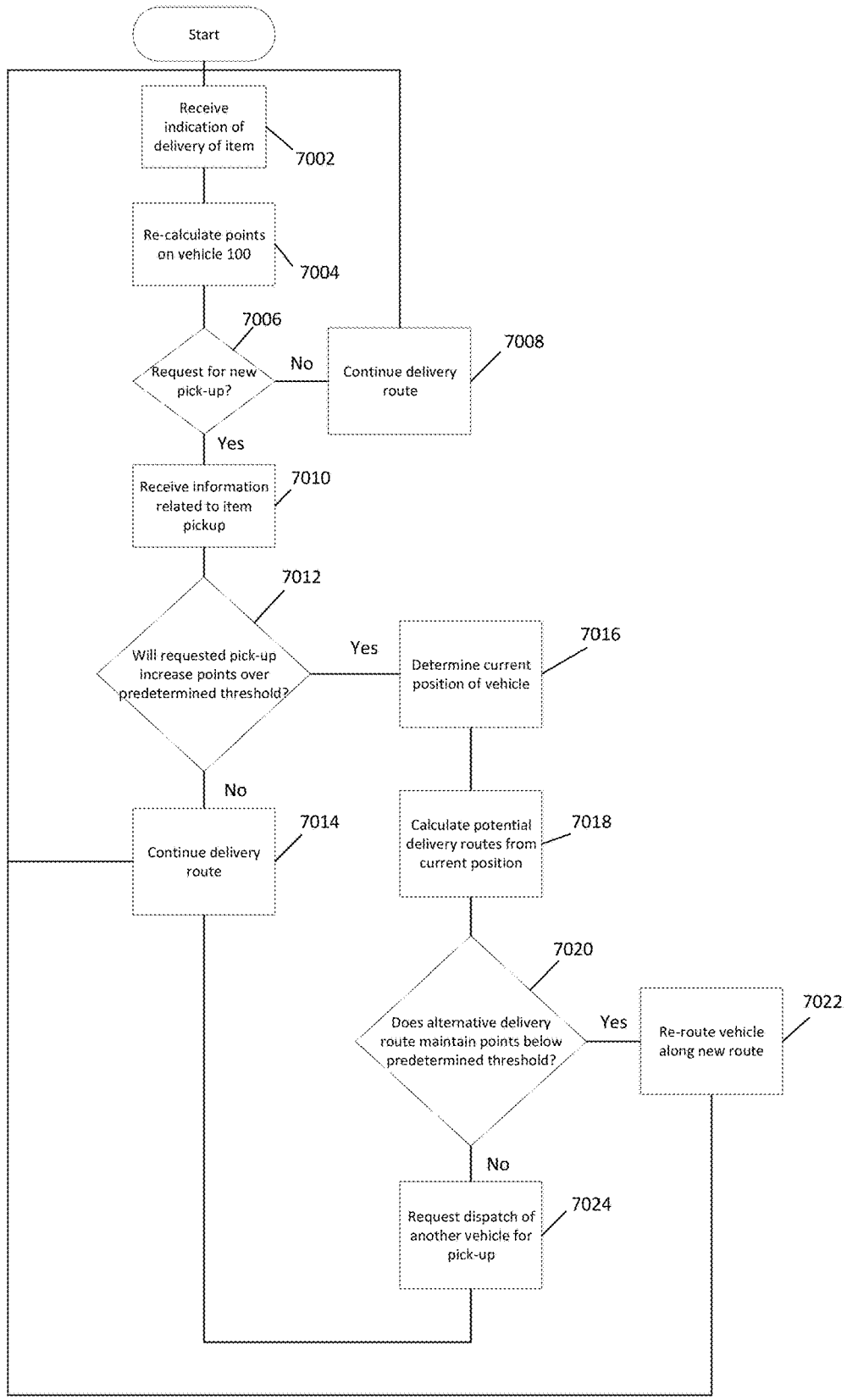

FIG. 7 schematically depicts an exemplary process of managing dangerous goods positioned within a vehicle/container in accordance with certain embodiments of the present invention.

DESCRIPTION

Various embodiments of the present invention now will be described more fully hereinafter with reference to the accompanying drawings. These inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. The term "dangerous good" is used herein to describe any item or items subject to shipping regulations, such as volatile items, explosives, caustic substances, or the like.

Dangerous goods shipping systems according to the present disclosure are directed to the management of dangerous goods carried on a vehicle and/or transportable container. In some embodiments, the systems include an automatic points calculation feature. Some jurisdictions (e.g., the European Union, among others) have adopted a United Nations treaty (e.g., the ADR, as defined herein below) that contains a regulatory point system where the jurisdiction may assign different dangerous goods a "point" value depending on the type and quantity of dangerous goods being shipped. Systems and methods according to the present disclosure monitor and track the number of points of dangerous goods carried by a vehicle/container. For example, the systems store information related to the number of points of dangerous goods (calculated based the type and quantity of dangerous goods) within items currently being carried by a vehicle/container. As deliveries of items containing dangerous goods are made from the vehicle/container, the systems update the stored information to reflect the reduced number of points of dangerous goods currently on the vehicle/container. Conversely, when the vehicle/container picks up dangerous goods, the systems update the information to reflect the increased number of points of dangerous goods currently on the vehicle/container. In embodiments, the systems re-calculate potential delivery routes, such that the vehicle/container may deliver items containing dangerous goods prior to picking up new items, so as to maintain the total points of dangerous goods on the vehicle/container below a predetermined threshold. These and other embodiments are described in greater detail below in reference to the appended drawings.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2

SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of a system that can be used in conjunction with various embodiments of the present invention. As shown in FIG. 1, the system may include one or more vehicles/containers 100, one or more mobile computing entities 105, one or more central computing entities 110, one or more Global Positioning System (GPS) satellites 115, one or more location sensors 120, one or more telematics sensors 125, one or more information/data collection devices 130, one or more networks 135, one or more user computing entities (not shown), and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, stand-alone entities, the various embodiments are not limited to this particular architecture.

A. EXEMPLARY VEHICLE/CONTAINER

In various embodiments, the term vehicle/container 100 is used generically. For example, a vehicle/container 100 may be a manned or an unmanned, powered or un-powered tractor, truck, car, motorcycle, moped, Segway, bicycle, golf cart, hand truck, cart, trailer, tractor and trailer combination, van, flatbed truck, vehicle, drone, airplane, helicopter, boat, barge, unit load device (ULD), transportable container and/or any other form of object for moving or transporting people and/or items (e.g., one or more packages, parcels, bags, containers, loads, crates, items banded together, vehicle parts, pallets, drums, the like, and/or similar words used herein interchangeably). The vehicle/container 100 generally includes a cargo area configured to hold one or more items for transport. In one embodiment, each vehicle/container 100 may be associated with a unique vehicle identifier (such as a vehicle ID) that uniquely identifies the vehicle/container 100. The unique vehicle ID (e.g., trailer ID, tractor ID, vehicle ID, and/or the like) may include characters, such as numbers, letters, symbols, and/or the like. For example, an alphanumeric vehicle ID (e.g., "AS445") may be associated with each vehicle/container 100. In another embodiment, the unique vehicle ID may be the license plate, registration number, or other identifying information/data assigned to the vehicle/container 100.

FIG. 1 shows one or more computing entities, devices, and/or similar words used herein interchangeably that are associated with the vehicle/container 100, such as the information/data collection device 130 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

FIG. 2 provides a block diagram of the information/data collection device 130 that may be attached, affixed, disposed upon, integrated into, or part of the vehicle/container 100. The information/data collection device 130 may collect telematics information/data (including location data) and transmit/send the information/data to the mobile computing entity 105, the central computing entity 110, and/or various other computing entities via one of several communication methods.

The information/data collection device 130 may include, be associated with, or be in wired or wireless communication with one or more processors 200 (various exemplary processors are described in greater detail below), the one or more location-determining devices or one or more location sensors 120, the one or more telematics sensors 125, one or more real-time clocks 215, a J-Bus protocol architecture, one or more electronic control modules (ECM) 245, one or more communication ports 230 for receiving telematics information/data from various sensors (e.g., via a CAN-bus), one or more communication ports 205 for transmitting/sending data, one or more RFID tags/sensors 250, one or more power sources 220, one or more information/data radios 235 for communication with a variety of communication networks, one or more memory modules 210, and one or more programmable logic controllers (PLC) 225. It should be noted that many of these components may be located in the vehicle/container 100 but external to the information/data collection device 130.

Referring again to FIG. 1, in one embodiment, the one or more location sensors 120, modules, or similar words used herein interchangeably may be one of several components in wired or wireless communication with or available to the information/data collection device 130. Moreover, the one or more location sensors 120 may be compatible with the GPS satellite 115 or GPS satellites, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle and/or the vehicle's operator and with various communication points (e.g., cellular towers or Wi-Fi access points) positioned at various locations throughout a geographic area to monitor the location of the vehicle 100 and/or its operator. The one or more location sensors 120 may be used to receive latitude, longitude, altitude, heading or direction, geocode, course, position, time, and/or speed information/data (e.g., referred to herein as telematics information/data and further described herein below). The one or more location sensors 120 may also communicate with the central computing entity 110, the information/data collection device 130, mobile computing entity 105, and/or similar computing entities.

As indicated, in addition to the one or more location sensors 120, the information/data collection device 130 may include and/or be associated with one or more telematics sensors 125, modules, and/or similar words used herein interchangeably. For example, the telematics sensors 125 may include vehicle sensors, such as engine, fuel, odometer, hubometer, tire pressure, location, weight, emissions, door, and speed sensors. The telematics information/data may include, but is not limited to, speed data, emissions data, RPM data, tire pressure data, oil pressure data, seat belt usage data, distance data, fuel data, idle data, and/or the like (e.g., referred to herein as telematics data). The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) data, and/or meteorological information/data (e.g., referred to herein as telematics data).

In one embodiment, the ECM 245 (FIG. 2) may be one of several components in communication with and/or available to the information/data collection device 130. The ECM 245 (FIG. 2), which may be a scalable and subservient device to the information/data collection device 130, may have information/data processing capability to decode and store analog and digital inputs from vehicle systems and sensors. The ECM 245 (FIG. 2) may further have information/data processing capability to collect and present telematics information/data to the J-Bus (which may allow transmission to the information/data collection device 130), and output standard vehicle diagnostic codes when received from a vehicle's J-Bus-compatible on-board controllers 240 (FIG. 2) and/or sensors.

As indicated, a communication port 230 (FIG. 2) may be one of several components available in the information/data collection device 130 (or be in or as a separate computing entity). Embodiments of the communication port 230 (FIG. 2) may include an Infrared information/data Association (IrDA) communication port, an information/data radio, and/or a serial port. The communication port 230 (FIG. 2) may receive instructions for the information/data collection device 130. These instructions may be specific to the vehicle/container 100 in which the information/data collection device 130 is installed, specific to the geographic area in which the vehicle/container 100 will be traveling, specific to the function the vehicle/container 100 serves within a fleet, and/or the like. In one embodiment, the information/data radio 235 (FIG. 2) may be configured to communicate with a wireless wide area network (WWAN), wireless local area network (WLAN), wireless personal area network (WPAN), or any combination thereof. For example, the information/data radio 235 (FIG. 2) may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols (including Bluetooth low energy (BLE)), wireless universal serial bus (USB) protocols, and/or any other wireless protocol.

B. EXEMPLARY CENTRAL COMPUTING ENTITY

FIG. 3 provides a schematic of a central computing entity 110 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the central computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the central computing entity 110 may communicate with vehicles/containers 100, mobile computing entities 105, and/or the like.

As shown in FIG. 3, in one embodiment, the central computing entity 110 may include or be in communication with one or more processing elements 305 (also referred to as processors, processing circuitry, and/or similar terms used herein interchangeably) that communicate with other elements within the central computing entity 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the central computing entity 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the central computing entity 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the central computing entity 110 with the assistance of the processing element 305 and operating system.

As indicated, in one embodiment, the central computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the central computing entity 110 may communicate with computing entities or communication interfaces of the vehicle/container 100, mobile computing entities 105, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the central computing entity 110 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the central computing entity 110 may include or be in communication with one or more input elements, such as a keyboard input, a mouse input, a touch screen/display input, audio input, pointing device input, joystick input, keypad input, and/or the like. The central computing entity 110 may also include or be in communication with one or more output elements (not shown), such as audio output, video output, screen/display output, motion output, movement output, and/or the like.

As will be appreciated, one or more of the central computing entity's 110 components may be located remotely from other central computing entity 110 components, such as in a distributed system. Furthermore, one or more of the components may be combined and additional components performing functions described herein may be included in the central computing entity 110. Thus, the central computing entity 110 can be adapted to accommodate a variety of needs and circumstances.

C. EXEMPLARY MOBILE COMPUTING ENTITY

FIG. 4 provides an illustrative schematic representative of a mobile computing entity 105 that can be used in conjunction with embodiments of the present invention. In one embodiment, the mobile computing entities 105 may include one or more components that are functionally similar to those of the central computing entity 110 and/or as described below. As will be recognized, mobile computing entities 105 can be operated by various parties, including operators of vehicles/containers 100. As shown in FIG. 4, a mobile computing entity 105 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as vehicles/containers 100, central computing entities 110, and/or the like. In this regard, the mobile computing entity 105 may be capable of operating with one or more air interface standards, communication protocols, modulation types, and access types. More particularly, the mobile computing entity 105 may operate in accordance with any of a number of wireless communication standards and protocols. In a particular embodiment, the mobile computing entity 105 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile computing entity 105 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The mobile computing entity 105 can also download changes, add-ons, and updates, for instance, to its firmware, software (e.g., including executable instructions, applications, program modules), and operating system.

According to one embodiment, the mobile computing entity 105 may include location determining aspects, devices, modules, functionalities, and/or similar words used herein interchangeably. For example, the mobile computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the mobile computing entity's 105 position in connection with a variety of other systems, including cellular towers, Wi-Fi access points, and/or the like. Similarly, the mobile computing entity 105 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The mobile computing entity 105 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the mobile computing entity 105 to interact with and/or cause display of information. The user input interface can comprise any of a number of devices allowing the mobile computing entity 105 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the mobile computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile computing entity can collect contextual information/data as part of the telematics data.

The mobile computing entity 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the mobile computing entity 105.

III. Exemplary Dangerous Goods Shipping Management System

Referring to FIGS. 5 and 6A-6E, one example of the operation of a dangerous goods shipping management system is schematically depicted. In the example shown in FIG. 5, a carrier may initially load a vehicle/container 100 with an item or plurality of items, such as items A, B, C, F, and G. Each of the items or plurality of items may include a parcel or group of parcels, a package or group of packages, scrap metal banded together, a vehicle part, a box, a crate, a drum, a box strapped to a pallet, and/or the like. The items or plurality of items may be loaded to the vehicle/container 100 at an origin point O, which may include a loading facility, sorting facility, a warehouse or the like.

In the example depicted in FIGS. 5 and 6A, the vehicle/container 100 is initially loaded with items A, B, C, F, and G, which each contain dangerous goods for delivery along a delivery route. The vehicle/container 100 may initially be scheduled to embark on a first delivery route, to serviceable points AA, BB, CC, DD, EE, FF, GG, and HH. In one configuration, the vehicle/container 100 to initially go to serviceable point AA, then to serviceable point BB, then to serviceable point CC, sequentially until the vehicle/container 100 reaches serviceable point HH while travelling the first delivery route. The first delivery route may initially be determined on a variety of factors, such as efficiency (i.e., travelling the shortest route possible while accessing each of the serviceable points AA-HH), established traffic patterns (i.e., the shortest amount of time to access each of the serviceable points AA-HH), or the like. In embodiments, the first delivery route may be determined prior to the vehicle/container 100 departing the origin O, or may be determined after the vehicle/container 100 has departed the origin O.

As depicted in FIG. 6A, each of the items A, B, C, F, and G contain a dangerous good categorized as a Class 1, 2, or 3 dangerous good. The categorization of the dangerous goods may correlate with relevant regulations and may be based on the type of dangerous goods being shipped. In one example, the classification of the dangerous goods may be based on the European Agreement Concerning the International Carriage of Dangerous Goods by Road (ADR), such as outlined in Table A of Chapter 3.2 of the ADR. Further, each of the classes of categories of dangerous goods may be assigned a point value per unit quantity of the dangerous goods, as outlined in Sections 1.1.6.3-1.1.6.4 of the ADR. For example, Class 1 goods may be assigned 50 points per kilogram (kg) or liter (L) of goods being shipped. Class 2 goods may be assigned 3 points per kg or L of goods being shipped, and Class 3 goods may be assigned 1 point per kg or L of goods being shipped.

In some jurisdictions, vehicles/containers 100 may have a predetermined threshold of dangerous goods that the vehicle/container 100 may carry. For example, in some jurisdictions, a vehicle/container 100 may not carry over 1000 points of dangerous goods without requiring a placard indicating the nature of the dangerous goods being carried by the vehicle/container 100 and/or without requiring a driver or operator with specialized training. Additionally, in some jurisdictions, vehicles/containers 100 may have a predetermined threshold of dangerous goods that the vehicle/container 100 may carry over certain roadways or railways, such as tunnels, bridges, or the like. For example, some jurisdictions may prohibit a vehicle/container 100 from carrying over 1000 points of dangerous goods over or through specified passageways.

Referring again to the examples shown in FIGS. 5 and 6A, when the vehicle/container 100 is initially loaded, the items loaded into the vehicle/container 100 include items A, B, C, F, and G. The quantity of dangerous goods within each of the items may represent net mass in kg for solid materials, liquefied gases, and dissolved gases, and may represent L for liquid materials. In the example shown in FIG. 6A, item A is carrying a Class 1 dangerous good with a quantity of 5 (kg or L), such that item A includes 250 points of dangerous goods (quantity of 5*50 points/kg or L). Item B is carrying a Class 2 dangerous good with a quantity of 25 (kg or L), such that item B includes 75 points of dangerous goods (quantity of 25*3 points/kg or L) and item C is carrying a Class 3 dangerous good with a quantity of 150 (kg or L), such that item C includes 150 points of dangerous goods (quantity of 150*1 point/kg or L). Item F is carrying a Class 3 dangerous good with a quantity of 20 (kg or L), such that item F includes 20 points of dangerous goods (quantity of 20*1 point/kg or L), and item G is carrying a Class 3 dangerous good with a quantity of 10 (kg or L), such that item G includes 500 points of dangerous goods (quantity of 10*50 points/kg or L). Accordingly, when initially loaded, a cargo area of the vehicle/container 100 includes a sum total of 995 points of dangerous goods.

Proceeding along the first delivery route, the vehicle/container 100 is scheduled to deliver item A to serviceable point AA, item B to serviceable point BB, item C to serviceable point CC, item F to serviceable point FF, and item G to serviceable point GG. As described above, the first delivery route may include the vehicle/container 100 proceeding sequentially from serviceable point AA to serviceable point HH (i.e., in a clockwise direction as depicted).

Accordingly and referring to FIGS. 5 and 6B, the vehicle/container 100 initially delivers item A to serviceable point AA, thereby reducing the point total for the cargo area of the vehicle/container 100 to 745 points (i.e., the point total for items B, C, F, and G).

Referring to FIGS. 5 and 6C, the vehicle/container 100 may then deliver item B to serviceable point BB, thereby reducing the point total of the cargo area of the vehicle/container 100 to 670 points (i.e., the point total for items C, F, and G).

After the vehicle/container 100 delivers item B to serviceable point BB, a request for the pickup of an additional item containing dangerous goods may be received. For example and referring to FIGS. 5 and 6D, a request may be received to pick up item D at serviceable point DD. In the example shown in FIG. 6D, item D is carrying a Class 1 dangerous good with a quantity of 5 (kg or L), such that item D includes 250 points of dangerous goods. As the vehicle/container 100 proceeds along the first delivery route, if the vehicle/container 100 were to pick up item D prior to delivery of items E, F, and G, the total number of points of dangerous goods within the cargo area of the vehicle/container 100 would be 1020 points.

In response to identifying that the scheduled pickup (i.e., the pickup of item D) would cause the points of dangerous goods carried by the vehicle/container 100 to exceed the predetermined threshold (i.e., 1000 points in the present example), a second delivery route is calculated. For example, and referring to FIGS. 5 and 6E, instead of proceeding sequentially from serviceable points DD to GG, the vehicle/container 100 may proceed from serviceable point HH to serviceable point GG, from serviceable point GG to serviceable point FF, from serviceable point FF to serviceable point EE, and from serviceable point EE to serviceable point DD (i.e., travelling in a counter-clockwise direction as opposed to a clockwise direction as depicted in FIG. 5). By travelling along the second delivery route (i.e., in the counter-clockwise direction), the vehicle/container 100 may deliver item G to serviceable point GG prior to picking up item D at serviceable point DD. In the example shown in FIG. 6E, by delivering item G to serviceable point GG prior to picking up item D at serviceable point DD, the overall point total of dangerous goods carried by the vehicle/container 100 may be maintained below the 1000 point predetermined threshold. In this manner, by dynamically re-calculating the route of the vehicle/container 100, the amount of dangerous goods carried by the vehicle/container may be maintained below a predetermined threshold.

Referring to FIG. 7, one method for managing the shipment of dangerous goods is schematically depicted. In a first step 7002, the mobile computing entity 105 receives an indication that an item has been delivered from the vehicle/container 100. The mobile computing entity 105 may receive an indication that the item has been delivered from the vehicle/container 100. For example, the mobile computing entity 105 may scan or read the item/shipment identifier and other appropriate information (e.g., location and time of the scan or reading) and communicate this information to the central computing entity 110, thereby indicating that the item has been delivered to a desired serviceable point. Prior to delivering items, the central computing entity 110 and/or the mobile computing entity 105 may receive and store package materials data related to items carried in the cargo area of the vehicle/container 100, the package materials data including data/information related to the quantity and nature of dangerous goods positioned within the items.

The system proceeds to step 7004, and re-calculates the total number of points on the vehicle/container 100 based on package materials data associated with the delivered item, including the quantity and nature of dangerous goods positioned within the delivered item. In the example described above with respect to FIGS. 6A-6B, the mobile computing entity 105 re-calculates the total number of points on the vehicle/container 100 resulting from the delivery of item A, reducing the point total on the vehicle/container 100 from 995 to 745.

Proceeding to step 7006, the system determines whether a new request to pick-up an item at a serviceable point along the delivery route has been received. For example, the mobile computing entity 105 may receive a request, such as from the central computing entity 110 indicating that a pick-up has been requested along the delivery route of the vehicle/container 100. If no pick-up request has been received, the system proceeds to step 7008 and the system provides an indication that the vehicle/container 100 may continue along the present delivery route, such as via the mobile computing entity 105. The system then returns to step 7002 and awaits the receipt of an indication of another delivery of an item.

If at step 7006 the system determines that a new pickup along the present delivery route is requested, the system proceeds to step 7010 and the mobile computing entity 105 receives information related to the requested pick up. For example, the mobile computing entity 105 may receive information related to the location of the serviceable point at which the desired pickup is requested. The mobile computing entity 105 also receives package materials data related to the dangerous goods positioned within the item. In particular, the mobile computing entity 105 may receive an indication of the type of material in the item, along with a quantity of the material.

The system then proceeds to step 7012, and determines whether the item associated with the requested pickup will increase the points of dangerous goods carried within the cargo area of the vehicle/container 100 above a predetermined threshold. As one example, the predetermined threshold may be 1000 points of dangerous goods, as outlined above.

If the system, via the central computing entity 100 and/or the mobile computing entity 105, determines that the item associated with the requested pickup will not increase the points of the vehicle/container 100 above the predetermined threshold, the system proceeds to step 7014, accepts the requested pickup and provides an indication to the mobile computing entity 105 to proceed along the delivery route.

If the system determines that the item associated with the requested pickup will increase the points of the vehicle/container 100 above the predetermined threshold, the system proceeds to step 7016, and determines the current position of the vehicle 100.

The system then proceeds to step 7018, and, via the central computing entity 110 and/or the mobile computing entity 105, calculates potential alternative delivery routes based on the determined current position of the vehicle/container 100. At step 7020, the system determines whether any of the calculated alternative potential delivery routes maintain the points of the vehicle/container 100 below the predetermined threshold while allowing the vehicle/container 100 to deliver any other items positioned within the cargo area of the vehicle/container 100.

If none of the calculated alternative potential delivery routes maintain the points of the vehicle/container 100 below the predetermined threshold, the system proceeds to 7024 and the central computing entity 110 and/or the mobile computing entity 105 generates a request to dispatch another vehicle/container to pick up the requested item from the serviceable point. If at least one of the calculated alternative potential delivery routes would maintain the points of the vehicle/container 100 below the predetermined threshold, the system proceeds to step 7022 and the central computing entity 110 and/or the mobile computing entity 105 provides instructions for the vehicle/container 100 to proceed along the at least one calculated alternative delivery route.

In some aspects, a beacon (e.g., a RFID tag) may be placed on each of the items (e.g., items A, B, C, D, E, F and G) loaded into the vehicle/container 100. The beacon placed on each of the items may be configured to transmit a unique identifier, which may be linked to the shipping records for the respective item. Each beacon may be read by a beacon reader (e.g., the one or more RFID sensors 250) as each respective item enters and exits the vehicle/container 100. For, example, as an item enters/exits the vehicle/container 100 and the respective beacon is read, the dangerous goods point value associated with the vehicle/container 100 would be automatically recalculated. Reading the beacons of the items as they enter and exit the vehicle/container 100 may provide a check against scanning the items with the mobile computing entity 105 as the items are loaded and/or delivered. In other aspects, the beacons and the beacon reader(s) could be used in place of the scans with the mobile computing entity 105.

It should now be understood that systems and methods according to the present disclosure include an automatic points calculation feature. The systems store information related to the number of points of dangerous goods (calculated based the type and quantity of dangerous goods) within items currently being carried by a vehicle/container. As deliveries of items containing dangerous goods are made from the vehicle/container, the systems update the stored information to reflect the reduced number of points of dangerous goods currently on the vehicle/container. Conversely, when the vehicle/container picks up dangerous goods, the systems update the information to reflect the increased number of points of dangerous goods currently on the vehicle/container. In embodiments, the systems re-calculate potential delivery routes, such that the vehicle/container may deliver items containing dangerous goods prior to picking up new items, so as to maintain the total points of dangerous goods on the vehicle/container below a predetermined threshold.

F. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for transporting goods, the system comprising:
    a cargo area for holding a plurality of items;
    one or more memory storage areas associated with the cargo area; and
    one or more processors in communication with the one or more memory storage areas for executing the steps of:
        receiving first package materials data associated with a first item positioned within the cargo area, wherein the first package materials data comprises (1) a classification associated with materials positioned within the first item, and (2) a quantity of the materials positioned within the first item;
        storing the first package materials data in the one or more memory storage areas;
        determining, based on the first package materials data, a first point value associated with the cargo area based at least in part on the classification and the quantity of the material positioned within the first item;
        receiving a first delivery route, wherein the first delivery route comprises a first serviceable point at which the first item is scheduled to be removed from the cargo area;
        receiving a request to pick up a second item at a second serviceable point on the first delivery route;
        receiving second package materials data associated with the second item, wherein the second package materials data comprises (1) a classification associated with materials positioned within the second item, and (2) a quantity of the materials positioned within the second item;
        determining, based on the first package materials data and the second package materials data, a second point value associated with the cargo area based at least in part on the classification and the quantity of the material positioned within the first item and the second item;
        determining whether the second point value exceeds a predetermined threshold;
        in response to determining that the second point value exceeds the predetermined threshold, generating a second delivery route based at least in part on the second point value associated with the first item and the second item; and
        generating instructions to re-route the cargo area from the first delivery route to the second delivery route and causing the delivery of the first item along the second delivery route.

2. The system of claim 1, further comprising a vehicle and wherein the cargo area is positioned within the vehicle.

3. The system of claim 1, further comprising a container and wherein the cargo area is positioned within the container.

4. The system of claim 1, wherein the first serviceable point is designated to be serviced before the second serviceable point on the second delivery route.

5. The system of claim 1, wherein the second serviceable point is designated to be serviced before the first serviceable point on the first delivery route.

6. The system of claim 1, further comprising a mobile computing entity, wherein the mobile computing entity comprises the one or more processors.

7. The system of claim 6, wherein receiving the first package materials data comprises scanning indicia positioned on the first item with the mobile computing entity.

8. A method for transporting goods, the method comprising:
    receiving first package materials data associated with a first item positioned within a cargo area, wherein the first package materials data comprises (1) a classification associated with materials positioned within the first item, and (2) a quantity of the materials positioned within the first item;
    determining, based on the first package materials data, a first point value associated with the cargo area based at least in part on the classification and the quantity of the material positioned within the first item;
    receiving a first delivery route, wherein the first delivery route comprises a first serviceable point at which the first item is scheduled to be removed from the cargo area;
    receiving a request to pick up a second item at a second serviceable point on the first delivery route;
    receiving second package materials data associated with the second item, wherein the second package materials data comprises (1) a classification associated with materials positioned within the second item, and (2) a quantity of the materials positioned within the second item;
    determining, based on the first package materials data and the second package materials data, a second point value associated with the cargo area based at least in part on the classification and the quantity of the material positioned within the first item and the second item;
    determining whether the second point value exceeds a predetermined threshold;
    in response to determining that the second point value exceeds the predetermined threshold, generating a second delivery route based at least in part on the second point value associated with the first item and the second item; and
    re-routing the cargo area from the first delivery route to the second delivery route; and
    causing the delivery of the first item along the second delivery route.

9. The method of claim 8, wherein the cargo area is positioned within a vehicle.

10. The method of claim 8, wherein the cargo area is positioned within a container.

11. The method of claim 8, wherein the first serviceable point is designated to be serviced before the second serviceable point on the second delivery route.

12. The method of claim 8, wherein the second serviceable point is designated to be serviced before the first serviceable point on the first delivery route.

13. The method of claim 8, wherein receiving the first package materials data comprises scanning indicia positioned on the first item with a mobile computing entity.

14. The method of claim 13, wherein receiving the second package materials data comprises receiving a signal from a central computing entity with mobile computing entity.

15. One or more non-transitory computer storage media storing computer-executable instructions that, when executed by a computing device, cause the computing device to perform operations comprising:

receiving first package materials data associated with a first item positioned within a cargo area, wherein the first package materials data comprises (1) a classification associated with materials positioned within the first item, and (2) a quantity of the materials positioned within the first item;

determining, based on the first package materials data, a first point value associated with the cargo area based at least in part on the classification and the quantity of the material positioned within the first item;

receiving a first delivery route, wherein the first delivery route comprises a first serviceable point at which the first item is scheduled to be removed from the cargo area;

receiving a request to pick up a second item at a second serviceable point on the first delivery route;

receiving a second package materials data associated with the second item, wherein the second package materials data comprises (1) a classification associated with materials positioned within the second item, and (2) a quantity of the materials positioned within the second item;

determining, based on the first package materials data and the second package materials data, a second point value associated with the cargo area based at least in part on the classification and the quantity of the material positioned within the first item and the second item;

generating a second delivery route based at least in part on the second point value associated with the first item and the second item;

generating instructions to re-route the cargo area from the first delivery route to the second delivery router; and causing the first item to be delivered along the second delivery route.

16. The computer program product of claim 15, further comprising determining whether the second point value exceeds a predetermined threshold.

17. The computer program product of claim 16, further comprising generating the second delivery route in response to determining that the second point value exceeds the predetermined threshold.

18. The computer program product of claim 15, wherein the cargo area is positioned within a vehicle.

19. The computer program product of claim 15, wherein the first serviceable point is designated to be serviced before the second serviceable point on the second delivery route.

20. The computer program product of claim 15, wherein the second serviceable point is designated to be serviced before the first serviceable point on the first delivery route.

* * * * *

UNITED STATES PATENT AND TRADEMARK OFFICE
CERTIFICATE OF CORRECTION

PATENT NO. : 10,783,489 B2
APPLICATION NO. : 15/895767
DATED : September 22, 2020
INVENTOR(S) : Paul Bonin et al.

Page 1 of 1

It is certified that error appears in the above-identified patent and that said Letters Patent is hereby corrected as shown below:

In the Claims

In Column 18, Line 45, Claim 8, after "item;" delete "and".

Signed and Sealed this
Twenty-fourth Day of November, 2020

Andrei Iancu
*Director of the United States Patent and Trademark Office*